H. C. Sergeant,

Flue and Tubular Boiler.

No. 2,082. Reissued Oct. 3, 1865.

Witnesses:
Chas. Hollingshead
John S. Hollingshead Jr.

Inventor:
Henry C. Sergeant

N. PETERS, PHOTO-LITHOGRAPHER, WASHINGTON, D. C.

UNITED STATES PATENT OFFICE.

HENRY C. SERGEANT, OF COLUMBUS, OHIO.

IMPROVEMENT IN STEAM-BOILERS.

Specification forming part of Letters Patent No. 49,565, dated August 22, 1865; Reissue No. 2,082, dated October 3, 1865.

*To all whom it may concern:*

Be it known that I, HENRY C. SERGEANT, of the city of Columbus and the State of Ohio, have invented a new and Improved Mode of Constructing Steam-Boilers; and I do hereby declare that the following is a full and exact description of the same, reference being had to the accompanying drawings and to the letters of reference marked thereon.

Figure 1:
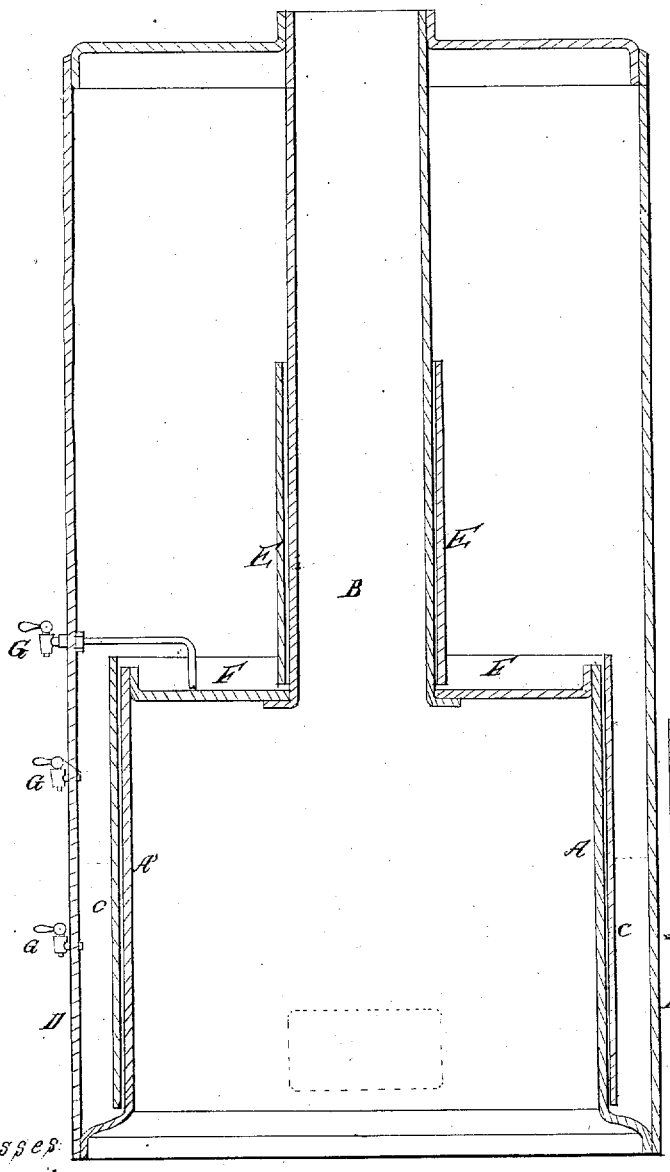
Figure 2:
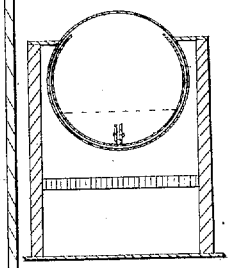

The nature of my invention consists in placing sheets of metal cylinders or tubes around the fire-surface of boilers, so arranged that the circulation will carry the water up along the fire-surface much higher than that on the outside of the sheet or metal cylinder, as shown in Fig. 1; but as shown in Fig. 2, much higher on the outside than inside. By this arrangement the fire-surface will always be covered with water as long as there is any above the lower edge of the sheet cylinder or tubes around the fire-surface and heat enough to produce the circulation; also, the circulation is so great that the sides of the metal and fire-surface is scoured and kept perfectly clean, free from lime and sediment.

To enable others skilled in the art to construct and use my invention, I will proceed to describe its construction.

Figure 1 represents a vertical cross-section of a vertical boiler. Fig. 2 represents a vertical cross-section of a common cylinder-boiler, showing how the improvements can be used in different forms of boilers.

Letters A A in Fig. 1 represent the fire-box; B, the fire-flue, through which the heat and smoke pass from the fire-box. C C represent the cylinder or casing placed around the fire-box, fastened with set-screws at the top and bottom or otherwise, with a space at the bottom to admit of the flow of water and steam upward. D D represent the outside shell of the boiler. E E represent the tube or cylinder placed around the fire-flue, with openings —bottom and top—the same as arouud the fire-box, for the passage of steam and water. For ordinary purposes one fire-flue may be sufficient; but if found advantageous or necessary, several may be used, with the improvement attached to all. F F represent the crown-sheets of the fire-box. G G G represent three gage-cocks, the upper one with a tube attached, passing over and down upon the crown-sheet for the purpose of showing when the circulation has begun. The two lower ones show the proper height of the water outside of the cylinder or casing around the fire-box. The dotted line is intended to represent the water-line.

Fig. 2, showing a section of cylinder-boiler with furnace below, represents the fire-line up above the water-line, (which is the dotted line;) but as soon as the fire is started the water will pass up between the inside casing and the boiler and flow over at the top, and continue to flow, being supplied in the at the bottom with water.

The operation is very simple. After the boiler has been supplied with water up to the second gage, the fire can be started, which will cause the water to flow up between the casing C and the fire-box A, falling over onto the crown-sheet F. As soon as this has been covered, the casing around the fire-flue will pick it up and pass it up around the fire-flue, keeping it in contact with the heated surface until the greatest amount of the water will be generated into steam. The height of the water on the outside of the cylinder has nothing to do with keeping the fire-surface covered. As long as the lower edge of the casing is covered with water, so long will the fire-surface be covered, when there is heat enough to keep up the circulation.

What I claim, and desire to secure by Letters Patent, is—

1. The combination of the metal cylinder or casing around the fire-surface with the fire box and reservoir for a body of water upon the crown sheet.

2. The combination of the fire flue and casing around, when so arranged as to receive the water from the crown-sheet and convey it upward in contact with the flue.

3. So arranging the casing around the fire-surface of boilers as to allow the steam to come in contact with one side of the casing while the current of water is in contact with the other side, substantially the same as specified in the foregoing specification.

HENRY C. SERGEANT.

Witnesses:
CHAS. H. LINDENBERG,
B. G. BAUMGARD.